(No Model.)
J. T. ROBINSON.
PAPER SCORING OR CUTTING MACHINE.
No. 503,751. Patented Aug. 22, 1893.
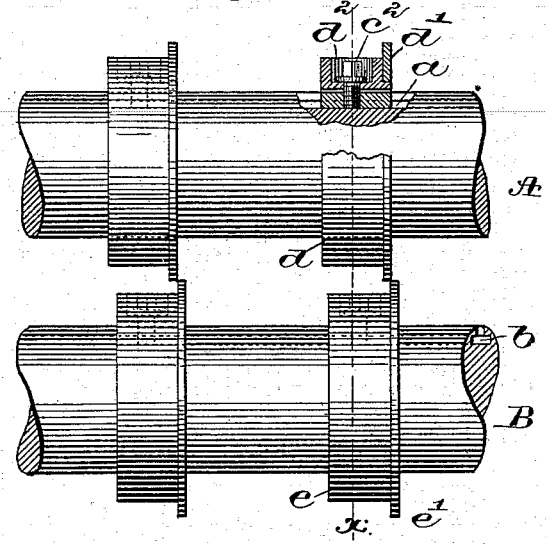
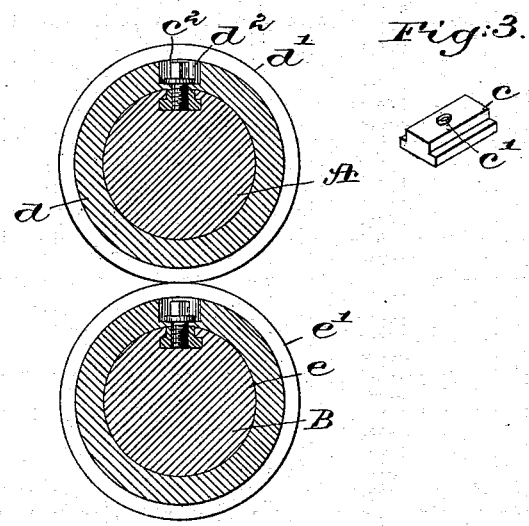
Witnesses.
Edward F. Allen.
Louis N. Gowell
Inventor:
John T. Robinson
by Crosby & Gregory
attys.

UNITED STATES PATENT OFFICE.

JOHN T. ROBINSON, OF HYDE PARK, MASSACHUSETTS.

PAPER SCORING OR CUTTING MACHINE.

SPECIFICATION forming part of Letters Patent No. 503,751, dated August 22, 1893.

Application filed November 14, 1892. Serial No. 451,970. (No model.)

*To all whom it may concern:*

Be it known that I, JOHN T. ROBINSON, of Hyde Park, county of Norfolk, State of Massachusetts, have invented an Improvement in Paper Scoring or Cutting Machines, of which the following description, in connection with the accompanying drawings, is a specification, like letters on the drawings representing like parts.

So far as I am aware, all circular or rotary trimming knives or cutters have had their hubs or heads secured to the shafts carrying them by a set screw extended through the hub or head and bearing against the shaft, so that the act of setting the screw home raises the adjacent part of the hub from the shaft, while the diametrically opposite part is drawn against the shaft. If the center of the screw is the slightest distance to one side of the center of the hub the latter will be tipped to one side or the other out of the true perpendicular to the center of rotation of the shaft. The slightest inaccuracy resulting therefrom in the position of the two co-operating blades carried by parallel shafts makes it impossible to cut paper accurately. Inasmuch as the hubs are narrow it is practically impossible to place the set screw in the exact center and still permit free space for the head thereof to be rotated, and furthermore, slight wear upon one part of the screw end will have the same effect and throw the cutter out of the plane perpendicular to the axis of the shaft.

This invention has for its object to improve and simplify the class of machines employed for scoring and cutting paper and having disks secured on rotating shafts, my invention relating more especially to the manner of securing the disk cutters on their shafts.

In accordance with my invention to be herein described, the shaft has a longitudinal undercut groove, irregular in cross section, into which is entered a series of nuts, one for each cutter, said nuts being adapted to enter and be held in the said groove. The cutters are composed of steel rings mounted on metal hubs preferably of cast iron, through which are extended clamp screws seated on the hubs and entering the nuts. The threaded parts of the said screws act to draw the nuts toward the hubs, thus clamping the hubs firmly to the shafts to thus obviate any accidental slipping of the cutters toward each other, yet by loosening the clamp screws the nuts together with said hubs may be slid on the shafts to thus accurately adjust the cutters, they always remaining truly at right angles to the centers of rotation of their carrying shafts.

Figure 1 in elevation, partially broken out, shows a sufficient portion of a paper scoring or cutting machine with my improvements added to enable my invention to be understood; Fig. 2, a section in the line $x$ Fig. 1, and Fig. 3, a detail showing one of the nuts detached.

The two parallel rotary shafts A, B, may be supposed to be common to any usual form of paper cutting or scoring machine, said shafts being rotated in unison by a suitable gear. The shafts referred to have like grooves $a$, $b$, of a cross section other than round, said grooves running preferably the entire length of the roll and receiving like nuts $c$, of a shape corresponding with the cross section of the grooves referred to. These nuts are tapped, as at $c'$, to receive the like clamp screws $c^2$, shown in Fig. 1 by full and dotted lines. The shafts are surrounded by like hubs $d$, $e$, preferably of cast metal as iron, upon which are suitably mounted rotatory disk cutters or scorers $d'$, $e'$, in pairs. The hubs $d$, $e$, preferably have like pits $d^2$ extended partially through the hubs, enough metal being left to enable the flanges of the heads of the clamp screws to bottom on the said hubs. The heads preferably concealed in the said pits will be suitably shaped to be engaged preferably by some wrench or tool by which the screw may be screwed into or out of the nut, and in this way it is possible when the clamp screw is fully screwed in, to clamp the hub firmly and accurately upon the shaft so that there is no possibility of the cutter slipping out of place, for tightening of the screw draws the hub toward the nut, and at the same time tightly clamps the latter in the undercut groove, so that there is no possibility of the cutter twisting or tipping out of the perpendicular plane, yet by slightly loosening a screw and striking or pushing against the hub, said hub, its cutter, the clamp-screw, and nut may be slid longitudinally, the nut in its movements acting as a guide to keep the face of the cutter or scorer vertical or at right angles to the center of rotation of the shaft carrying it. This certainty of maintaining true and accurate position for the cutter when adjusted insures the correct meeting of the edges of the cutters or scorers during their rotation.

While my machine is especially adapted for cutting or scoring paper, yet it may be used to great advantage in cutting other sheet material such as lead, tin, &c.

Having described my invention, what I claim as new, and desire to secure by Letters Patent, is—

In a cutting and scoring machine, the parallel rotating shafts having longitudinal undercut grooves; a series of ring-shaped cutters having hubs adapted for the passage of a set screw, and having a sliding fit on said shafts, combined with screws extended through the hubs, and nuts adapted to be held in said grooves and connected to said screws and free to slide in said longitudinal grooves, a screw and nut for each hub, the loosening of a single screw enabling any cutter to be adjusted laterally on the shaft, the tightening of a screw causing the nut to be strained outwardly from the center of the shaft and clamped thereto to confine the cutter hub by pressure at but one point, substantially as described.

In testimony whereof I have signed my name to this specification in the presence of two subscribing witnesses.

JOHN T. ROBINSON.

Witnesses:
 GEO. W. GREGORY,
 LAURA MANIX.